United States Patent
Graham et al.

(10) Patent No.: US 7,055,901 B2
(45) Date of Patent: Jun. 6, 2006

(54) SCHOOL BUS PASSENGER SEAT WITH INTEGRATED RESTRAINTS

(75) Inventors: Thomas R. Graham, Fort Wayne, IN (US); Erik K. Nelson, Woodburn, IN (US); Patrick J. Mattes, Yoder, IN (US); Erik C. Wilson, Decatur, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/061,050

(22) Filed: Feb. 17, 2005

(65) Prior Publication Data

US 2005/0200172 A1  Sep. 15, 2005

Related U.S. Application Data

(60) Provisional application No. 60/548,031, filed on Feb. 26, 2004, provisional application No. 60/548,030, filed on Feb. 26, 2004.

(51) Int. Cl.
*B60N 2/42* (2006.01)

(52) U.S. Cl. .......................... 297/216.13; 297/216.14; 297/483; 403/2; 24/602

(58) Field of Classification Search ................ 297/470, 297/216.1, 216.13, 216.14, 483, 488; 296/68.1; 24/115 F, 602, 669; 403/2, 234; 280/751
See application file for complete search history.

(56) References Cited

U.S. PATENT DOCUMENTS

| 4,784,352 | A | | 11/1988 | Smith et al. |
| 4,930,808 | A | * | 6/1990 | Mikoll et al. ................ 280/751 |
| 5,468,044 | A | * | 11/1995 | Coman ................... 297/216.13 |
| 5,468,045 | A | * | 11/1995 | Weber ................... 297/216.13 |
| 5,867,877 | A | * | 2/1999 | Patterson et al. ............. 24/602 |
| 5,882,072 | A | * | 3/1999 | Morlock ................ 297/216.13 |
| 6,024,406 | A | * | 2/2000 | Charras et al. ........ 297/216.14 |
| 6,033,017 | A | * | 3/2000 | Elqadah et al. .......... 297/216.1 |
| 6,123,388 | A | | 9/2000 | Vits et al. |
| 6,485,098 | B1 | | 11/2002 | Vits et al. |
| 2004/0164595 | A1 | * | 8/2004 | Aufrere et al. ........ 297/216.14 |

* cited by examiner

*Primary Examiner*—Anthony D. Barfield
(74) *Attorney, Agent, or Firm*—Jeffrey P. Calfa; Dennis Kelly Sullivan; Susan L. Lukasik

(57) ABSTRACT

The invention involves a seat system with a movable and immovable portions that may be maintained and still operate during transients as required under the federal regulations. There is a quick release serviceability latch for a school bus passenger seat with integrated restraints. The inner and outer seat backs must be quickly detached from one another to facilitate repair or replacement of damaged seat components. A movable plunger is rigidly attached to the inner seat back frame. Another bracket with hole to accept the plunger is rigidly attached to the back pan of the outer back. The attachment of inner to outer seat backs must be strong enough so that they can't be pulled apart by hand but at the same time be detachable in the event of a crash. A tab that engages the plunger separates upon a rapid deceleration event.

7 Claims, 7 Drawing Sheets

SCHOOL BUS PASSENGER SEAT WITH INTEGRATED RESTRAINTS

This patent issued from a non-provisional patent application claiming the priority of provisional patent applications Ser. No. 60/548,030, filed Feb. 26, 2004, and Ser. No. 60/548,031, filed Feb. 26, 2004.

BACKGROUND

Automotive vehicles have had three point seat belt systems that combine a lap belt and an upper torso belt for some time now. The tongue may be swung across the person and engaged with a buckle affixed to the seat thereby positioning one portion of the belt across the lap and another portion of the belt across the upper torso.

Designers of school buses face a conundrum in including three point seat belts in buses in that the requirements involved with installing a three-point seat belt may act in conflict with the requirements for passive restraints. The U.S. federal government requirement for passive restraints requires that the rear side of the seat provide an impact barrier in which the seat back bends or deforms when subjected to the force of occupants impacting the rear side in a deceleration event. The National Highway Traffic Safety Administration, DOT (NHTSA), sets the federal requirements for these passive restraints. These are codified as 49 C.F.R. Section 571.222 (FMVSS 222).

The code specifies a passive restraint system, and does not require any sort of active restraints such as a two-point passenger restraining lap belt or a three-point passenger restraining lap belt and torso harness combination. The passive restraint requirement effectively provides a compartment in which an unbuckled passenger is constrained during a rapid deceleration of the bus. Although two point belt systems are offered on buses, designers need to consider three-point seat belts where there is a request for them through local, state, or transportation/parental action groups. Three point seat belt designs are also regulated under NHTSA code. These requirements relate to belts that are mounted in such a fashion that they inhibit a belted passengers forward movement. This three-point belt-mounting requirement is codified in 49 C.F.R. Sections 571.209 and 571.210 (FMVSS 209 and FMVSS 210).

The design conundrum results from the fact that tests have shown that in a rapid deceleration where the passenger in the front seat is buckled and the passenger in the rear seat is not, the initial action is that the buckled passenger moves forward applying tension on the buckled seat belt and the component the belt is affixed to. This results in a pulling of the fixture component in a forward direction thereby reducing the strength on the rear impact face for the unbuckled passenger behind the seat in question. Following the tension applied on the three-point belt, the rear passenger would be expected to contact the seat back. The reduction in seat back strength due to the pull on the three-point seat belt for FMVSS 210 requirement may reduce the ability of the seat back to meet the FMVSS 222 requirements. Recent school bus seat designs have been developed that involve a movable inner seat for the mounting of the three point seat belts and an immovable seat back portion for the absorption of the rear unbuckled passenger loads. The movable inner seat was inserted into a recess within the immovable seat back. The immovable seat back would be designed to deform in order to comply with FMVSS 222. One of these designs was disclosed in U.S. Pat. Nos. 6,123,388, and 6,485,098. The concept of a seat inserted within a seat was not new to this bus seat. That concept was disclosed in U.S. Pat. No. 4,784,352. One problem with this prior art was the complexity of the mechanism to stop the movable inner seat.

SUMMARY

The invention involves a seat system with a movable portion and a generally immovable portion that may be maintained and still operate during transients as required under the federal regulations. The initial portion of the invention entails a quick release serviceability latch for a school bus passenger seat with integrated restraints. The inner and outer seat backs must be quickly detached from one another to facilitate repair or replacement of damaged seat components (i.e. upholstery, foam and/or seat belts). A movable plunger is rigidly attached to the inner seat back frame. Another bracket with hole to accept the plunger is rigidly attached to the back pan of the outer back. During seat assembly, the plunger fits into the hole locking the two backs together. To facilitate seat serviceability, the plunger has a cable which is accessible at the bottom of the seat and when pulled disengages the two brackets and allows the inner seat to move forward. At this point work can easily be done to repair or replace seat components. The bracket with hole has a slit that is designed to separate under load and allow the plunger to come out of the hole in the event of a bus crash. However, it is strong enough so that the seat backs can't be pulled apart by hand. The plunger and associated brackets and cable are encapsulated inside the frame assembly assuring their proper operation.

The second portion of the invention entails a tab and hook attachment of the inner or movable seat portion of the school bus passenger seat. The attachment of inner to outer seat backs must be strong enough so that they can't be pulled apart by hand but at the same time be detachable in the event of a crash. A wire hook is rigidly attached to the inner seat back frame. A cutout with tab in the outer frame back pan accepts the wire hook. The force required to bend the tab and separate the two parts is higher than an individual can pull on the back by hand but weak enough that it separates in a crash event. The strength of the tab is designed to bend and give way only when a certain load is applied. It keeps the two backs attached and protected from vandalism but will separate in a crash event.

DRAWINGS

Other objects and advantages of the invention will become more apparent upon perusal of the detailed description thereof and upon inspection of the drawings, in which.

DESCRIPTION OF INVENTION

Figure 1:
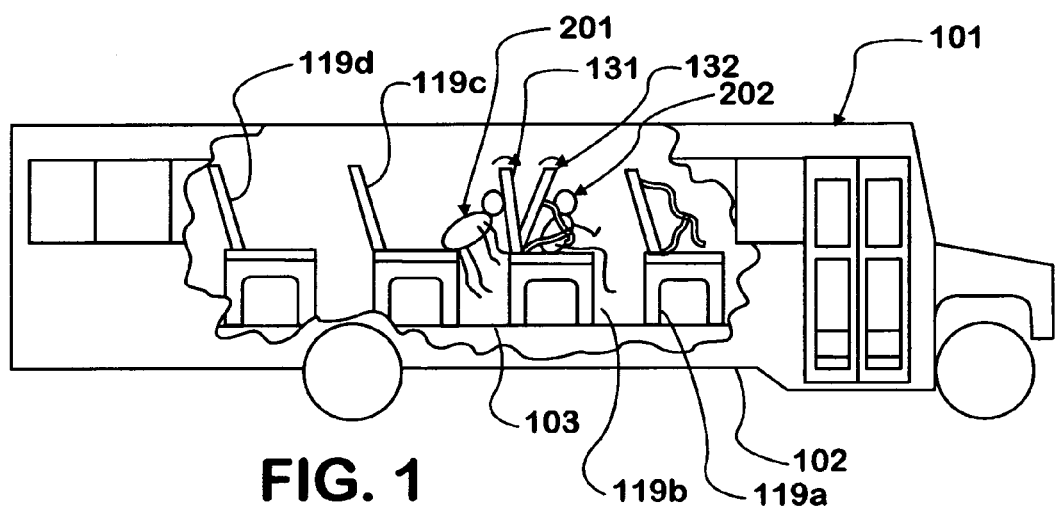
FIG. 1 is a cutaway view of a vehicle using an embodiment of the seat sub-system made in accordance with this invention.
Figure 2:
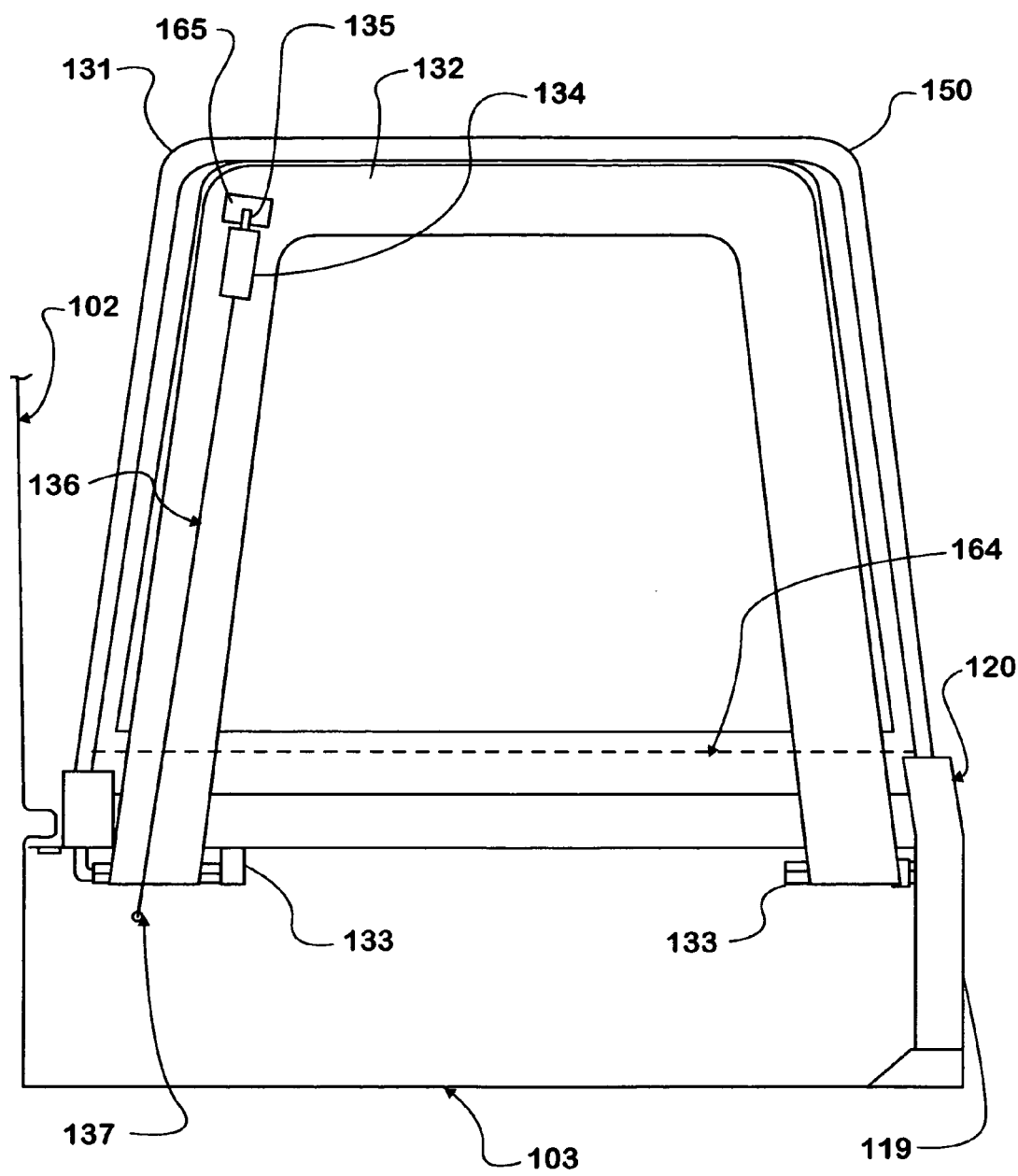
FIG. 2 is a back view of the seat sub-system for use with the vehicle shown in FIG. 1.
Figure 3:
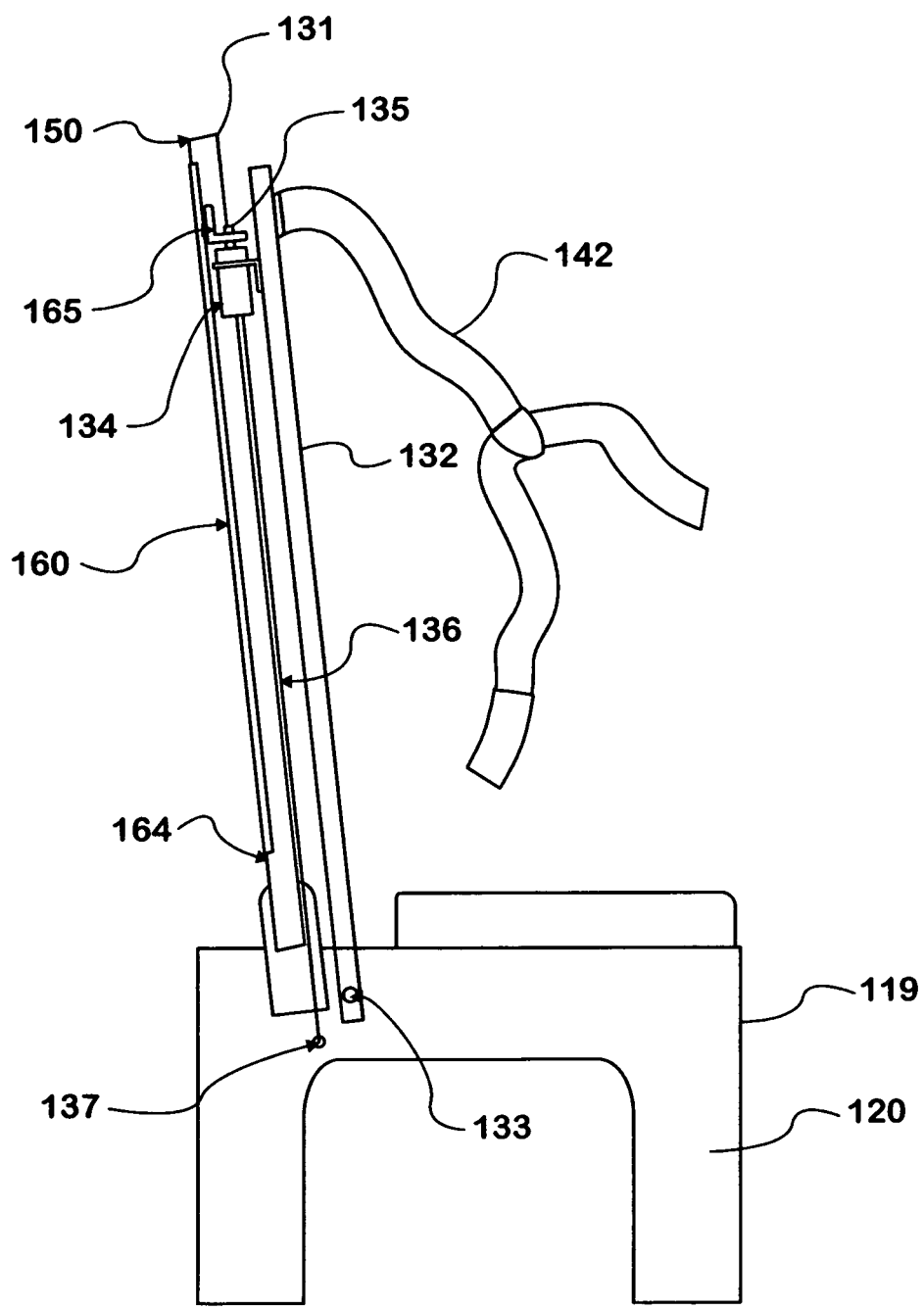
FIG. 3 is a side view of the seat sub-system of FIG. 2.

A motor vehicle 101 includes a passenger carrying body 102. The vehicle 101 may be a school bus. The body 102 includes a mounting floor 103 for the mounting and placement of passenger seating. The vehicle 101 shown in FIG. 1 has a series of passenger seats 119a, 119b, 119c, and 119d installed on the mounting floor 103 of the vehicle body 102 arranged from the front of the vehicle to the back. A rearward passenger 201 may sit in seat 119c and a frontward passenger 202 may sit in seat 119b in front of rearward passenger 201. One passenger seat with integrated passenger restraints 119 made in accordance with the invention has a movable front frame 132 that a seat occupant rests his or her back against normally. The front frame 132 is mounted to a seat frame 120 as shown in FIG. 2. The front frame 132 is the mounting point for the upper portion of a three-point seat belt 142 as shown in FIG. 3. The seat frame 120 is mountable to the bus body 102 mounting surface 103. The seat frame 120 contains a rear frame 131 to protect a passenger of rearward seat from moving out of his safety zone in a forward direction in the event of a rapid deceleration. This is shown in FIG. 1 that shows a rapid deceleration condition. The passenger 202 in seat 119b is buckled to the seat. The passenger 201 in the rearward seat 119c is not buckled. The passenger 201 is contained within the area between the rear frame of seat 119b and the front of seat 119c.

The vehicle may have a two-piece seat capable of complying with the federal requirements with reduced complexity. The front frame 132 is movable relative to the seat frame 120. In the embodiment shown in FIG. 3, the front frame 132 is rotatable about the seat frame 120 about a shaft or pivoting mechanism 133 that is at least partially engaged to the seat frame 120. The movable front frame 132 normally roughly parallel and in contact with the immovable rear frame 131. The movable front frame 132 may move forward due to the pull of a passenger held in a seat with belt 142. The force of the passenger on the belt 142 may pull the movable seat back 132 forward. The movement of the movable or front seat back 132 away from the rear frame 131 leaves the rear frame 131 intact to absorb the force from an unbelted passenger in the seat behind seat 119b.

Figure 4:
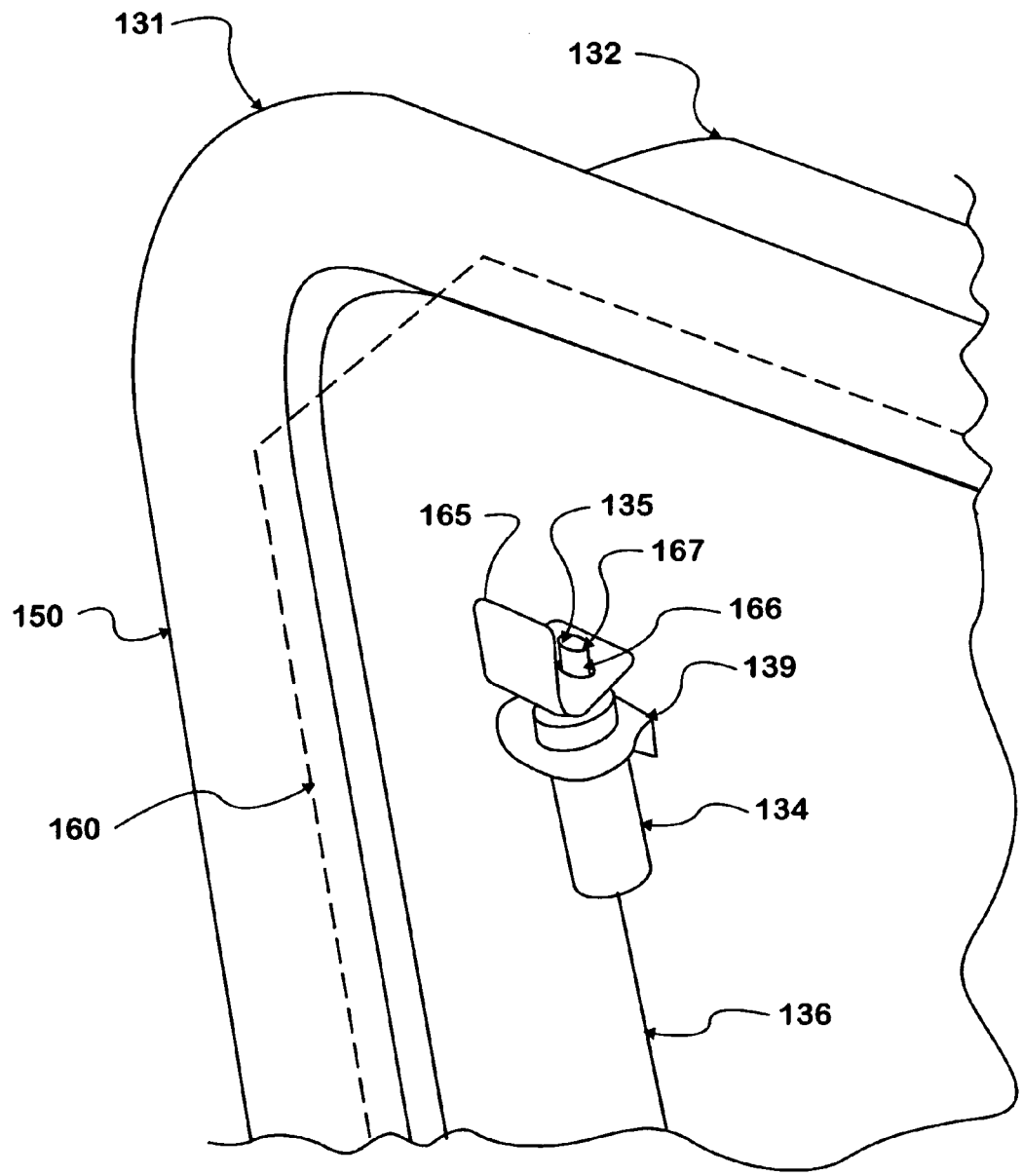
FIG. 4 is a partial cutaway perspective of the seat sub-system of FIG. 2.
Figure 5:
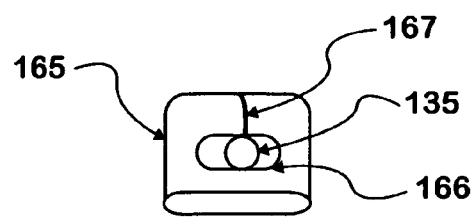
FIG. 5 is a top down view of the tab component of the immovable frame portion for engagement to the plunger of the movable frame of the seat sub-system of FIG. 2.
Figure 6:
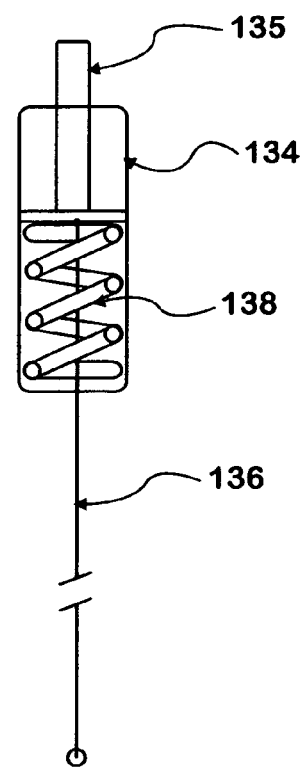
FIG. 6 is cutaway of the plunger of the movable frame of the seat sub-system of FIG. 2.

The rear frame 131 is comprised of three main components: a rear or back frame seat structure 150; and an energy absorbing back pan 160. The rear frame seat structure 150 may be one integral piece of tubing bent or formed. The back pan 160 may be steel, however, in any case it will be of a flexible material allowing for energy absorption. The back pan 160 is engaged to the rear frame structure 150 on three of its four edges. There is a back pan lower edge 164 that is free moving or disengaged to the rear frame structure 150. The back pan 160 is shown in phantom in FIGS. 2, 4, and 7 to allow the inventors to show some of the operating details of this invention. The fact that the back pan 160 is only rigidly mounted on 3 edges allows for the lower edge 164 of the back pan 160 to flex in the fore-aft direction. The lower edge 164 of the back pan 160 may be unformed or not folded over or hemmed to allow for enhanced energy absorbing flexibility in the event of impact upon the rearward side of the rear frame 131 by an unbuckled passenger sitting in a seat behind seat 119.

The initial portion of the invention entails a quick release serviceability latch for a school bus passenger seat with integrated restraints. The inner or front frame 132 and outer seat back or rear frame 131 must be quickly detached from one another to facilitate repair or replacement of damaged seat components (i.e. upholstery, foam and/or seat belts). A movable plunger 135 within a piston 134 is rigidly attached to the front frame 132 through a piston bracket 139. A rear frame release bracket 165 with hole 166 to accept the plunger 135 is rigidly attached to the-back pan 160 of the rear frame 131. During seat assembly, the plunger 135 fits into the hole 166 locking the front frame 132 and the rear frame 131 together. The piston 134 has a spring 138 that urges the plunger 135 upwards into engagement with the hole 166 when the seat is assembled. To facilitate seat serviceability, the plunger 135 has a cable 136, which is accessible at an end 137 at the bottom of the seat and when the cable end 137 is pulled the maintainer disengages the plunger 135 from the rear frame release bracket 165 hole 166 and allows the front frame 132 to move forward. At this point work can easily be done to repair or replace seat 119 components. The rear frame release bracket 165 with hole 166 has a slit 167 that is designed to separate under load and allow the plunger 135 to come out of the hole 166 in the event of a rapid deceleration of the vehicle or in the event of a vehicle crash. The bracket 165 will separate at the slit 167. This allows the front frame 132 to rotate in a forwards direction. However, the rear frame release bracket 165 is strong enough so that the front frame 132 and the rear frame 131 can't be pulled apart by hand. The plunger 135 and associated brackets and cable 136 are encapsulated inside the frame assembly behind the front frame 132, and in front of the back pan 160, assuring their proper operation. See FIGS. 2 to 6 for illustration of the above.

Figure 7:
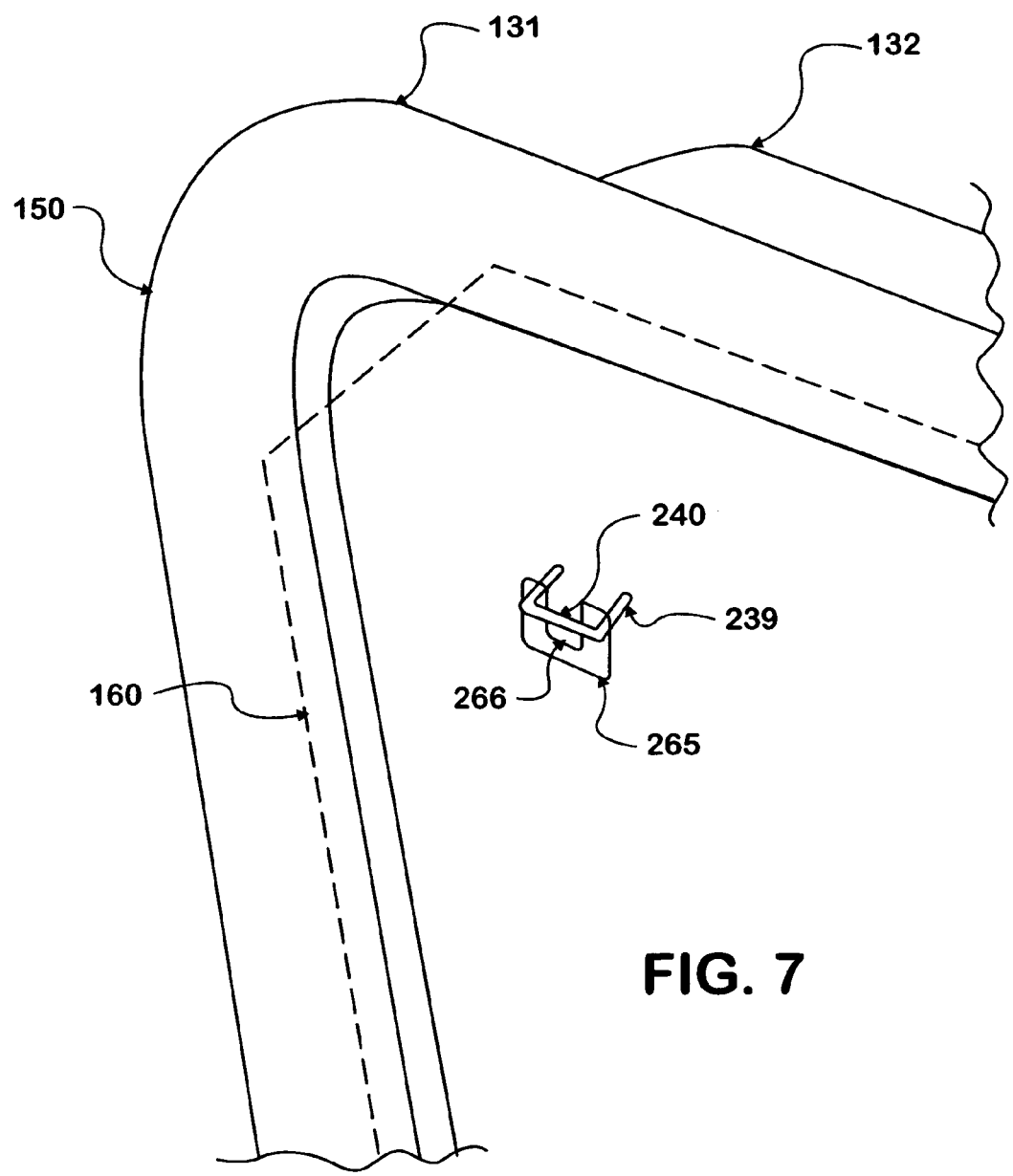
FIG. 7 is a partial cutaway perspective of a second embodiment seat sub-system for use with the vehicle shown in FIG. 1 and made in accordance with the invention.
Figure 8:
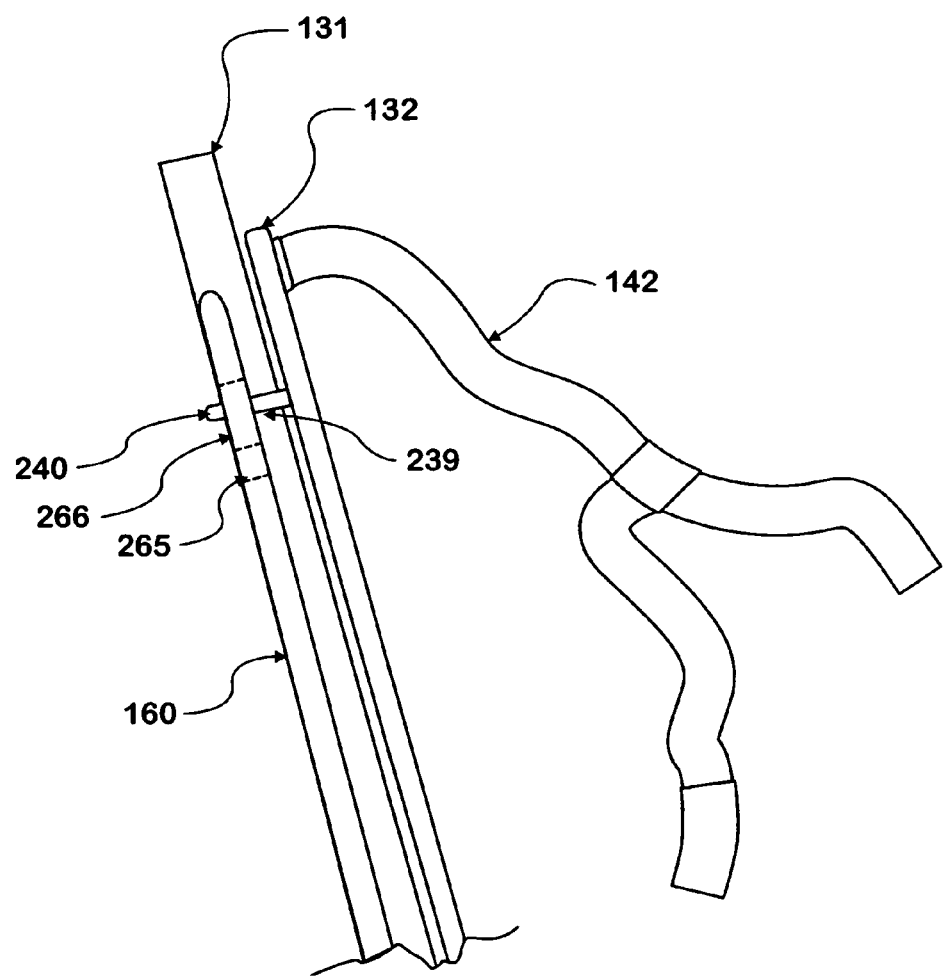
FIG. 8 is a side view of the seat sub-system of FIG. 7.

The second embodiment of the invention entails a tab and hook attachment of the inner or movable seat portion of the school bus passenger seat. This is illustrated in FIGS. 7 and 8. The attachment of front frame 132 to rear frame 131 must be strong enough so that they can't be pulled apart by hand but at the same time be detachable in the event of a crash. A wire hook 239 is rigidly attached to the front frame 132. A cutout 265 with tab 266 in the outer frame back pan 160 accepts a center cross piece 240 of the wire hook 239. The force required to bend the tab 266 and separate the wire hook cross piece 240 from the tab 266 due to bending forward and upwards of the tab 266 is higher than an individual can pull on the front frame 132 by hand but weak enough that the wire hook 239 separates from the tab 266 of the cutout 265 in a crash event or rapid deceleration event. The strength of the tab 266 is designed to bend and give way only when a certain load is applied. The strength of the tab 266 is controlled by material and material thickness designation of the back pan 160 in the vicinity around the cutout 265. The tab 266 and wire hook 239 arrangement keeps the front frame 132 and rear frame 131 attached and protected from vandalism but will separate in a crash event.

As described above, the seat system of this invention and vehicle made with the seat system provide a number of advantages, some of which have been described above and others of which are inherent in the invention. Also modifications may be proposed to the seat system and vehicle made with the seat system of this invention without departing from the teachings herein.

We claim:

1. A passenger seat for a multi-passenger motor vehicle, the vehicle having a body with a seat mounting surface, comprising:
    a seat frame, mountable to the seat mounting surface;
    an immovable rear seat frame engaged to said seat frame, said rear seat frame providing energy absorbing obstruction to protect a passenger of a vehicle rearward seat from moving out of his safety zone in a forward direction in the event of a vehicle rapid deceleration;

a movable front frame, pivotably engaged to said seat frame forward of said immovable rear seat frame, said movable front frame providing a back resting surface for a passenger;

said immovable rear frame being comprised of a rear frame seat structure, and an energy absorbing back pan;

a three point seat belt engaged to said movable front frame, said seat belt causing a pivoting force upon said movable front frame during an activation event;

a movable plunger being rigidly attached to said front frame;

a rear frame release bracket with a hole to accept said plunger being rigidly attached to said back pan of said rear frame;

said plunger fitting into said rear frame release bracket hole inhibiting front frame rotation away from said rear frame;

said movable plunger within a piston being engaged to said movable front frame through a piston bracket;

said piston having a spring with a tendency to urge said plunger into engagement with said hole in said rear frame release bracket; and said plunger having a cable accessible at an end near a lower portion of the seat and said cable end when pulled disengaging said plunger from said rear frame release bracket hole and allowing said front frame to be moved forward.

2. The passenger seat for a multi-passenger motor vehicle of claim 1, wherein:

said rear frame release bracket with hole having a slit that may separate under a predetermined load allowing said plunger to come out of said hole in the event of a rapid deceleration.

3. The passenger seat for a multi-passenger motor vehicle of claim 2, wherein:

said plunger and associated brackets and cable being encapsulated behind said front frame, and in front of said back pan.

4. A passenger seat for a multi-passenger motor vehicle, the vehicle having a body with a seat mounting surface, comprising:

a seat frame, mountable to the seat mounting surface;

an immovable rear seat frame engaged to said seat frame, said rear seat frame providing an energy absorbing obstruction to protect a passenger of a vehicle rearward seat frame moving out of his safety zone in a forward direction in the event of a vehicle rapid deceleration;

a movable front frame, pivotably engaged to said seat frame forward of said immovable rear seat frame, said movable front frame providing a back resting surface for a passenger;

said immovable rear frame being comprised of a rear frame seat structure, and an energy absorbing back pan;

a three point seat belt engaged to said movable front frame, said seat belt causing a pivoting force upon said movable front frame during an activation event;

a movable plunger being rigidly attached to said front frame;

a rear frame release bracket with a hole to accept said plunger being rigidly attached to said rear frame;

said plunger fitting into said rear frame release bracket hole inhibiting front frame rotation away from said rear frame;

said movable plunger within a piston being engaged to said movable front frame through a piston bracket;

said piston having a spring with a tendency to urge said plunger into engagement with said hole in said rear frame release bracket;

said plunger having a cable, said cable end when pulled disengaging said plunger from said rear frame release bracket hole and allowing said front frame to be moved forward; and said rear frame release bracket with hole having a slit that may separate under a predetermined load.

5. A multi-passenger motor vehicle, comprising:

a body with a seat mounting surface;

at least two passenger seats, one said passenger seat having seat frame, mounted to said seat mounting surface;

an immovable rear seat frame engaged to said seat frame, said rear seat frame providing an energy absorbing obstruction to protect a passenger of a vehicle rearward seat from moving out of his safety zone in a forward direction in the event of a vehicle rapid deceleration;

a movable front frame, pivotably engaged to said seat frame forward of said immovable rear seat frame, said movable front frame providing a back resting surface for a passenger;

said immovable rear frame being comprised of a rear frame seat structure, and an energy absorbing back pan;

a three point seat belt engaged to said movable front frame, said seat belt causing a pivoting force upon said movable front frame during an activation event;

a movable plunger being rigidly attached to said front frame;

a rear frame release bracket with a hole to accept said plunger being rigidly attached to said back pan of said rear frame;

said plunger fitting into said rear frame release frame bracket hole inhibiting front frame rotation away from said rear frame; and said movable plunger within a piston being engaged to said movable front frame through a piston bracket;

said piston having a spring with a tendency to urge said plunger into engagement with said hole in said rear frame release bracket; and said plunger having a cable accessible at an end near a lower portion of the seat and said cable end when pulled disengaging said plunger from said rear frame release bracket hole and allowing said front frame to be moved forward.

6. The multi-passenger motor vehicle of claim 5, wherein:

said rear frame release bracket with hole having a slit that may separate under a predetermined load allowing said plunger to come out of said hole in the event of a rapid deceleration.

7. The multi-passenger motor vehicle of claim 6, wherein:

said plunger and associated brackets and cable being encapsulated behind said front frame, and in front of said back pan.

* * * * *